July 6, 1948. K. B. KILBORN 2,444,831
EXTRUDING APPARATUS
Filed June 19, 1944 4 Sheets-Sheet 1

Inventor
Karl B. Kilborn
By
Attorney

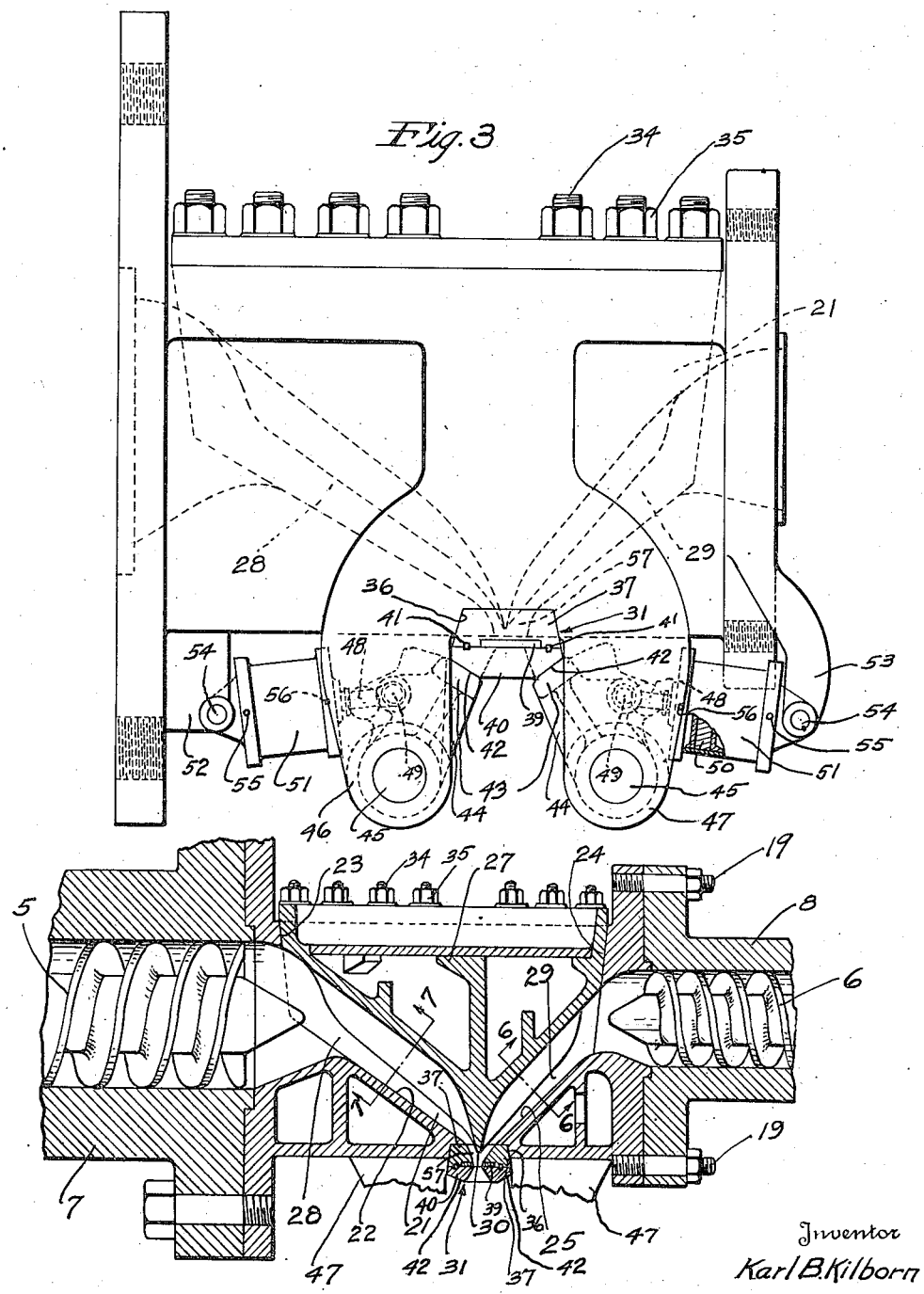

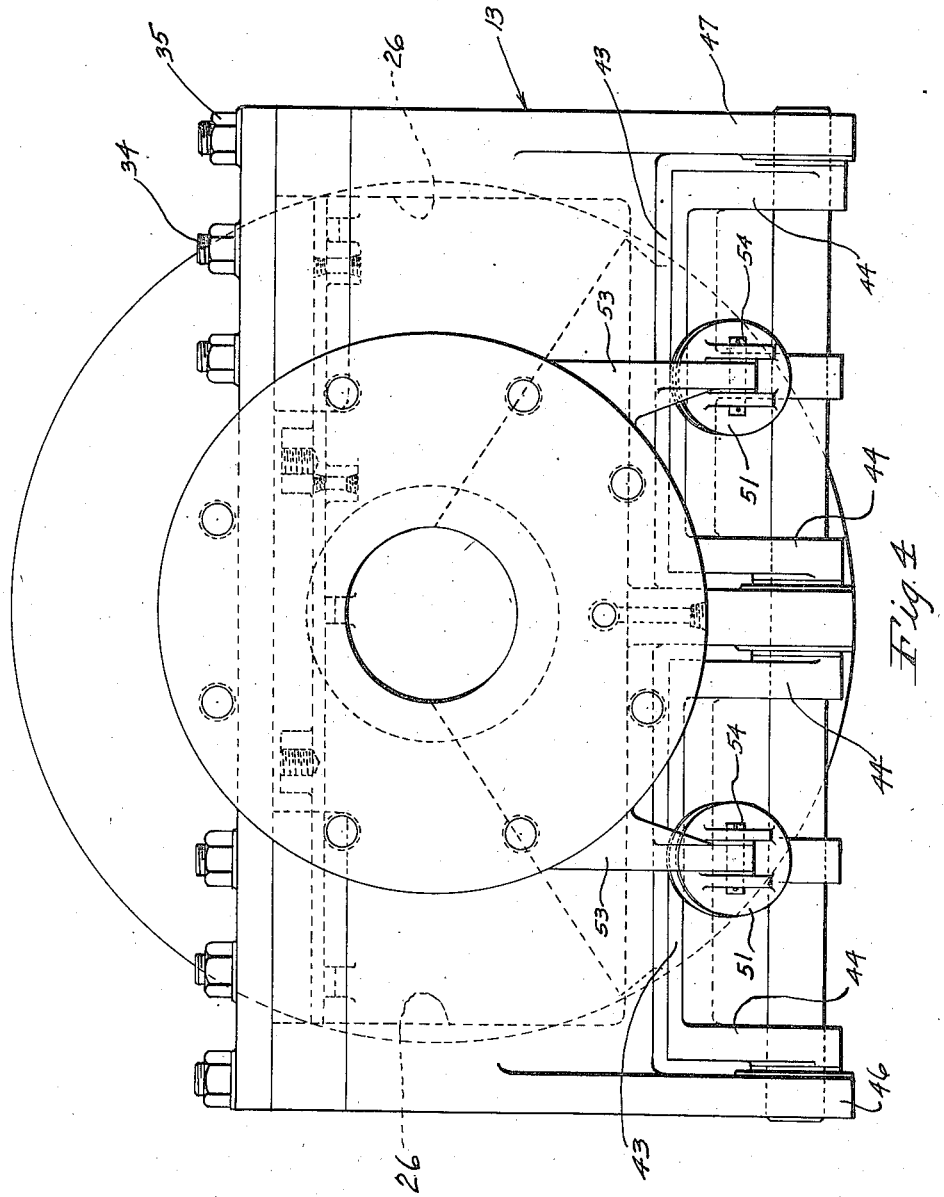

Patented July 6, 1948

2,444,831

UNITED STATES PATENT OFFICE 2,444,831

EXTRUDING APPARATUS

Karl B. Kilborn, Akron, Ohio, assignor to Wingfoot Corporation, Akron, Ohio, a corporation of Delaware Application June 19, 1944, Serial No. 540,953

3 Claims. (Cl. 18—13)

This invention relates to machines for extruding plastic material, commonly known as tube machines or pressure machines. More particularly this invention relates to an apparatus including a pair of tube machines for extruding uncured rubber compound in plastic form through a die head and die for forming strips of material of suitable shape and width to form composite strips for the outer wearing surface of vehicle tires such as the tread and sidewalls thereof.

Strips of this character are necessarily of different thickness and width according to the size of tire on which they are to be used, and uniform density is hard to control without the proper predetermined relationship between the volume of stock to the size of the die.

In previous apparatus of this character, a pair of tube machines in opposed relationship extrude plastic material through a common die head provided with a pair of cavities, one of which conducts plastic strip material suitable for the tread or ground contacting portion and the other cavity conducts strip material suitable for forming sidewall portions of a tire, both strips converging at a common die and uniting to form unitary strips suitable for forming the entire outer covering of a tire carcass. Previous apparatuses of this character are provided with a die head comprising a main body and a cap bolted thereto, said cap being removable for inspection and cleaning of the cavities, but the objection found in its construction is that part of the cavities are formed in the cap and part in the main body of the die head, which requires removal of the entire die head and the substitution of another one when it is desired to change from one size die head to another. This is a very heavy and laborious task, for when such a change is made it is necessary to move one of the tube machines axially in order to provide the proper clearance for removal of the die head. This results in a substantial loss in production as well as time and labor, and an unnecessary use of material and the costly machine work that accompanies the production of a die head of this character.

In some instances, in order to avoid changing the die head for different size of composite strip, a die head having larger cavities than is required for a certain size of strip is used. For example, if a die head having a cavity 36 inches wide were used to form a strip 24 inches wide, a 6 inch dead spot would be created on either side where the plastic stock would not move. Due to the heat of the die head this dead stock would slowly vulcanize, causing a bad condition and a waste of material. This condition was partially relieved by providing orifices at the sides of the cavities to permit the excess stock to bleed off. This excess material was then returned to a mill to be reworked. At best this method was inefficient and resulted in a waste of time, labor and material. Obviously, by thus bleeding off the excess stock, uniformity in density was more difficult to control and reflected adversely in the cost and quality of the completed strips.

An object of this invention is to eliminate the foregoing objections to previous apparatus to which this invention relates, by providing a duplex die head comprising a fixed main master body in which a chamber is formed the inner walls or faces of which possess plane smooth surfaces void of cavities to receive cavity blocks provided with total cavities in their faces whereby said cavity blocks cooperate with the plane faces in said chamber in sealing and interchangeable relationship. The chamber in the fixed main body of the die head is designed to receive interchangeable blocks containing total cavities of various forms so that cavities of the proper proportions and relationship to the size of die may be readily available without disturbing the main master body of the die head.

Another object of the invention is to provide a die head wherein the plastic conducting cavities therein will always be of a form whereby the volume of the plastic material will be in proper relationship to the size of the die being used and with the assurance that the composite strip will be of uniform density and of the proper dimensions.

Another object of this invention is to provide a swingable pneumatic means to hold the die block in place. Obviously, each size of composite strip requires a corresponding size of die and when the cavity block or V-block is changed, it is necessary to also remove the die block to which is attached a die of the proper dimensions. The die blocks are easily and quickly released or clamped in place by the manipulation of a valve to direct air under pressure from one end of air cylinders to the other. This avoids the necessity of removing nuts, bolts or wedges that were formerly used to secure the die block to the die head.

Thus, it will be apparent that providing a die head wherein the main body thereof will become a permanent fixture in an apparatus of this character, and whereby only the cavity block or V-block need be replaced for different sizes, and the simple and expeditious pneumatic clamping arrangement to hold the die block in place, will save time and labor and the efficiency of the apparatus will be substantially increased.

The objects and advantages of this invention will be more fully understood when considered in connection with the following detailed description and the accompanying drawings in which:

Figure 2 is a fragmentary cross-sectional view of the die head;

Figure 3 is a side view of the die head;

Figure 4 is an end view of the die head;

Figure 1:
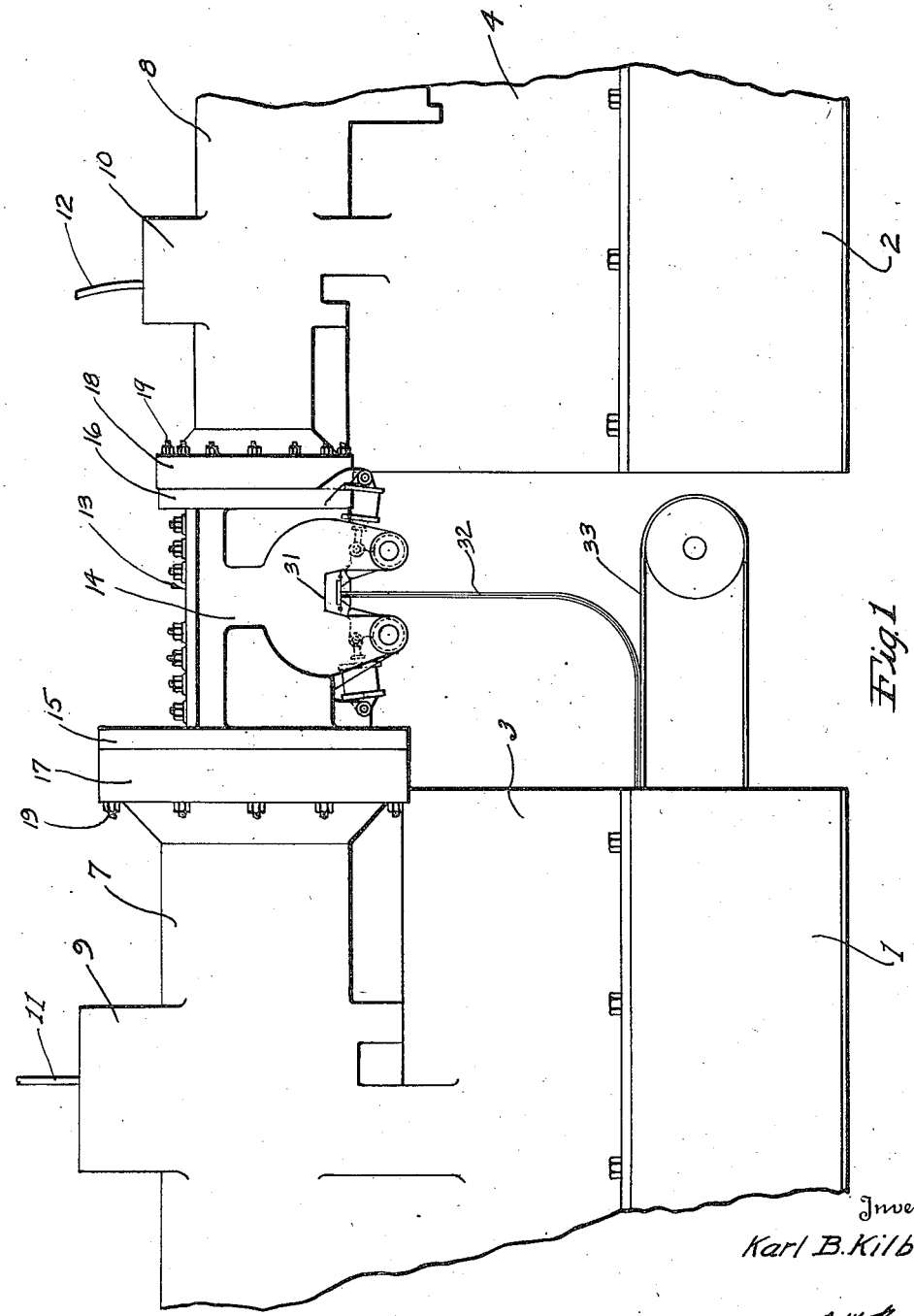
Figure 1 is a side elevation of the apparatus.

Referring to the drawings, the apparatus comprises bases 1 and 2 on which are mounted respectively a pair of conventional tube machines 3 and 4 provided with conveyor screws 5 and 6 rotatably mounted in cylinders 7 and 8.

The cylinders 7 and 8 are provided with hoppers 9 and 10 into which are fed strips of plastic material 11 and 12, each strip being of a different compound. Obviously, if desired, the strips 11 and 12 may be of the same compound.

It will be noted that the tube machines 3 and 4 are of different sizes and capacities. For the purpose of illustration the respective sizes of 12 inch and 8 inch mesh are herein shown and described, but machines of equal size or any available combination of sizes may be used, depending upon the size and capacity required for forming the various strips that converge to form a composite strip, as will be described later.

The tube machines 3 and 4 are positioned in axial alignment in face to face or opposed relationship, and have mounted therebetween a die head, indicated generally by the numeral 13 in axial alignment with said tube machines.

The die head comprises a main fixed master body 14 provided with flanges 15 and 16 which coincide with flanges 17 and 18 respectively of the tube machines 3 and 4 and are attached thereto through the medium of stud bolts 19.

The main body of the die head 14 has formed therein a chamber 21, the angular sides of which are in the general form of the letter V when viewed transversely with respect to the axis of the tube machine, the angular sides being defined by the lines 22, 23, 24 and 25 (see Figure 2). These chamber walls are provided with plane smooth surfaces void of depressions. The portion of the chamber closely adjacent the tube machine orifices is shaped to conform thereto. The ends of said chamber are terminated by plane smooth vertical walls 26.

Figure 5:
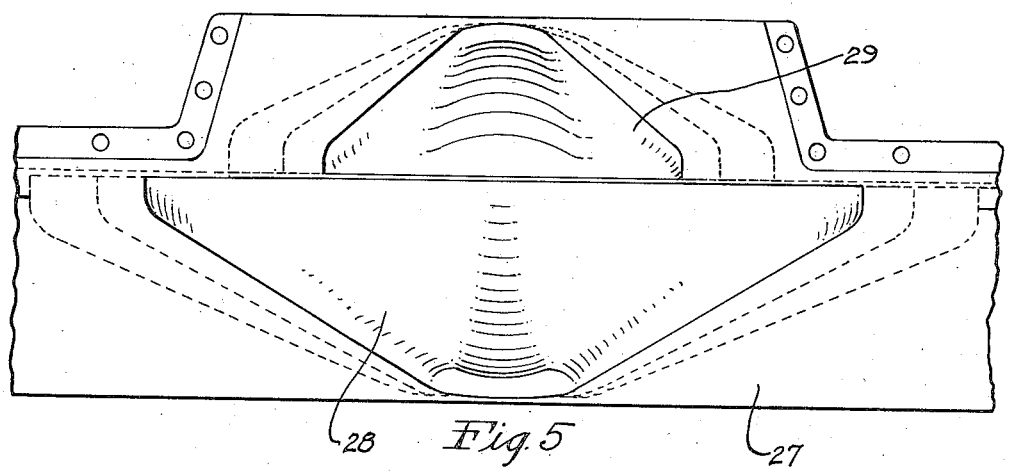
Figure 5 is a semidiagrammatic bottom view of the cavity block or V-block, with different sizes of cavities shown in dotted lines.
Figure 6:
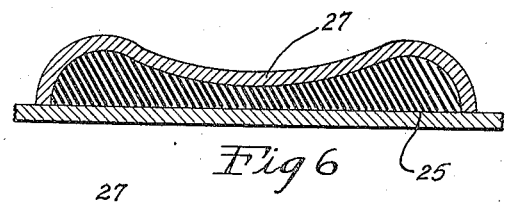
Figure 6 is a sectional view taken on the line 6—6 of Figure 2 through the tread cavity.
Figure 7:
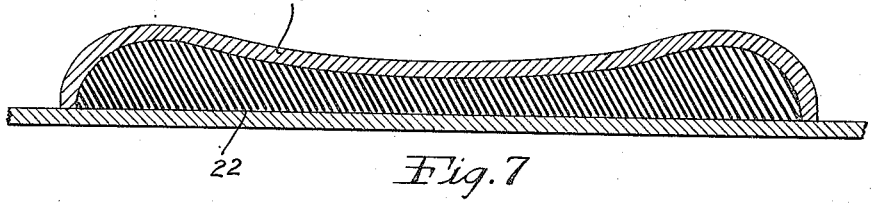
Figure 7 is a sectional view taken on the line 7—7 through the under-tread and sidewall cavity.
Figure 8:
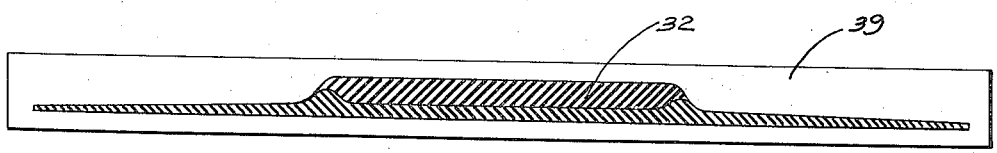
Figure 8 is a view of the die plate showing the final form of the plastic as it passes therethrough.

Formed to fit in interchangeable and sealing relationship in said chamber 21, cavity blocks or V-blocks 27 with angular sides or faces which coincide with the plane walls 22, 23, 24 and 25 of the chamber have passageways or cavities 28 and 29 formed therein. The cavity 28 conducts the plastic material which forms the under-tread and sidewall portions of a composite strip and the cavity 29 connects the plastic material for the tread portion, both cavities converging at a common point, as at 30, where the strips are combined into a unitary strip just before passing through the die block 31. The cavities in either face of the V-block 27 at their upper ends are formed to coincide with the orifices of the tube machines, but in their downward oblique course fan out so that the proper volume of stock will be proportionately delivered to the die, as best shown in Figures 5, 6 and 7 of the drawing. The composite strip 32 is shown in its final form as it passes through the die, as shown in Figure 8. From the die the composite strip is delivered vertically downward onto a conveyor belt 33 and is conveyed through a cooling tank in the usual course of preparing strips of this character.

The V-block 27 is provided with flanges and is firmly attached to the die head by the stud bolts 34 and nuts 35 and both the block and head are provided with chambers through which fluid is circulated in order to maintain the proper temperature of the plastic stock while passing through the passages provided therefor.

In the bottom of the die head 13 a recess or groove 36 is formed to receive the upper portion 37 of a die block 31. Said upper portion is provided with a slot into which is fitted a die plate 39 which is clamped into place by a lower portion 40 of the die block 31. Said upper and lower portions of the die block are held in alignment through the aid of keys 41.

In order to lock the die block 31 in the recess 36, the lower portion 40 has extending therefrom on either side and for the entire length of said die block, angular surfaces 42 for the purpose of cooperating with locking bars 43 formed on the ends of arms 44 pivotally mounted on shafts 45 which in turn are supported by bearing arms 46 and 47 extending from the die head 13. The locking bars are actuated by piston rods 48 pivotally attached to the arms 44, as at 49. Said piston rods are actuated by pistons 50 operating within cylinders 51 which are pivotally mounted on projections 52 and 53 extending from the main body of the master die head 14 by pivot pins 54. When air under pressure is admitted to the pivoted end of the cylinders through the ports 55, the pistons operate to swing the arms 44 in a locking position, as indicated in Figures 1 and 3, and when air under pressure is admitted through the ports 56, the arms 44 will swing clear of the die block 31, as indicated in dotted lines in Figure 3 of the drawings, to permit the removal of the die block assembly.

It will be noted that the die block 31 is provided with an opening 57 in its upper side. Said opening coincides with the cavities 28 and 29 and also with the opening in the die plate 39, in order to produce a composite strip that will be of uniform dimensions and density it is obvious that the cavities or passageways in the V-blocks and the die block and die must be of a proper predetermined relationship in order to obtain satisfactory uniformity and density. Although the invention is shown and described as applicable to a dual assembly of tube machines requiring a duplex die head, the invention is also applicable to single tube machines by providing a fixed master head capable of receiving interchangeable cavity blocks in which one or more cavities may be formed to convey plastic material from an extruding machine to a die to form plastic strips.

From the foregoing description it will be apparent that the practice of this invention will provide a substantial saving in time, labor and material and will provide a more uniform product, all of which will be reflected in improved quality and lower cost of the finished product in which unitary strips of the character disclosed become a part. Various forms and numbers of strips may be formed in accordance with the teachings of this invention, and it will be understood that the invention be limited only by the scope of the appended claims.

I claim:

1. An extrusion means for forming a composite strip of plastic material embodying portions having different physical characteristics, said extrusion means comprising a main body member having a generally V-shaped chamber therein defined by plane wall surfaces extending from an opening spanning the V to an opening at the apex thereof; shaping means on the main body member adjacent the apex opening; a removable generally wedge-shaped cavity block, the inclined walls of which contact the plane wall surfaces of the chamber; and a plurality of grooves formed in the inclined walls of the cavity block cooperating with the plane wall surfaces of the main body member to define a series of individual passageways leading to the apex opening in the chamber.

2. An extrusion means for forming a composite strip of plastic material embodying portions having different physical characteristics, said extrusion means comprising a main body member having a chamber therein open at one end thereof and of substantially V-shaped cross-section in one of its dimensions, said chamber being defined by plane wall surfaces converging toward an opening at the apex of the chamber; shaping means supported by the main body member adjacent the opening; a removable cavity block having two inclined walls which define a wedge-like shape, said inclined walls having formed therein a plurality of grooves of generally curvilinear cross-section, the marginal portions of which contact with the plane wall surfaces of the chamber when the cavity block and the main body member are interfitted to form in cooperation with said plane wall surfaces a number of passageways all of which connect with the opening in the chamber; and releasable locking means for demountably supporting the shaping means on the main body member.

3. A die head for forming and uniting strips of plastic material having different characteristics comprising a permanently fixed master body having a chamber therein, said chamber being defined by plane surfaces; a cavity block supported in said chamber provided with oppositely disposed converging walls the marginal portions of which rest upon said plane surfaces in said chamber in sealing relationship; a groove in said master body; a divided die block positioned in said groove having a forming die positioned therebetween; passageways formed in the converging walls of the cavity block to convey strips of plastic material therethrough to the forming die, said forming die having a single opening therein; angular surfaces formed on said die block; and means for locking said die block in said groove embodying pivotally mounted locking bars, piston rods pivotally connected to said locking bars, and air cylinders for actuating the piston rods, whereby said locking bars are brought into contact with the angular surfaces on said die block to lock said die block in said groove.

KARL B. KILBORN.

REFERENCES CITED

The following references are of record in the file of this patent:

UNITED STATES PATENTS

| Number | Name | Date |
| --- | --- | --- |
| 1,422,356 | Heller | July 11, 1922 |
| 1,952,469 | Snyder et al. | Mar. 27, 1934 |
| 2,061,407 | Royle | Nov. 17, 1936 |
| 2,096,362 | Lehman | Oct. 19, 1937 |